May 21, 1940. J. H. VAN UUM 2,201,509

SPRING CLIP DEVICE

Filed March 14, 1938

INVENTOR.
JOHN H. VAN UUM
BY John H. Leonard
HIS ATTORNEY.

Patented May 21, 1940

2,201,509

UNITED STATES PATENT OFFICE 2,201,509

SPRING CLIP DEVICE

John H. Van Uum, Lakewood, Ohio

Application March 14, 1938, Serial No. 195,677

3 Claims. (Cl. 24—73)

This invention relates to snap fasteners or spring clips of the general character used for connecting members such as hollow molding, bead trim, and the like to apertured supports such as automobile bodies.

This application is a continuation in part of my copending application, Serial No. 145,474, filed May 29, 1937, and entitled "Spring clip device."

One of the objects of the present invention is to provide a clip for connecting such a member to an apertured support and which may be installed in place in the support preparatory to snapping the member to be supported into engagement with the clip.

Another object is to provide a clip for this purpose in which the head portions of the clip which engage and secure the bead trim or other supported member are positively spaced from the support so that they may be more readily cooperated with the supported member.

A more specific but equally important object is to provide in such a clip a plurality of head portions, each positively spaced slightly different distances from the outer face of the supporting structure so that differences in thickness of the member to be supported are compensated for and firm interlocking of the clip with the supported member is provided in at least one point on each head portion under all circumstances.

Another object is to provide a clip in which the shank portion received in the aperture of the support is in the form of a closed loop so that the spring effect of the metal is utilized to provide a more firm engagement with the support.

Another object is to provide a clip having a plurality of head portions for not only forming land shoulders for limiting the amount of insertion of the clip, but part of which may engage the inner edges of the inturned flanges of the trim member and thus position the trim member accurately with respect to the clip in the plane of the outer surface of the support.

Other objects and advantages will become apparent from the following specification wherein reference is made to the drawing, in which.

Figure 2:
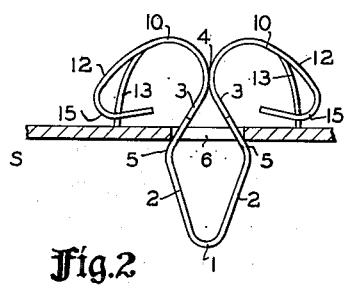
Fig. 2 is an end elevation of the clip illustrated in Fig. 1 showing the clip preparatory to installation of the bead trim thereon, the bead trim and support being shown in section for clearness in illustration.
Figure 1:
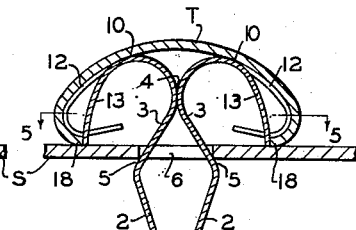
Fig. 1 is a side elevation of a clip embodying the principles of the present invention and installed in a supporting structure.
Figure 3:
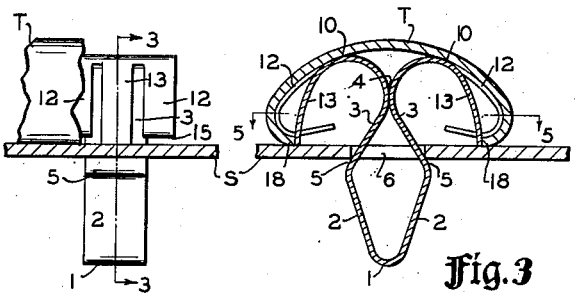
Fig. 3 is a sectional view of the clip and the support and trim member secured thereby and is taken on a plane indicated by the line 3—3 in Fig. 1.
Figure 4:
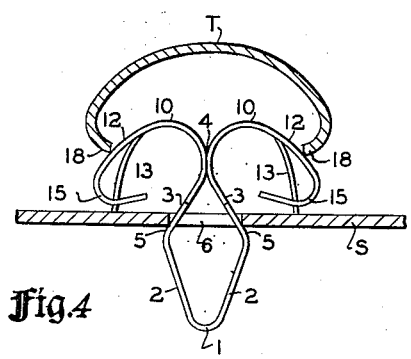
Fig. 4 is an end elevation similar to Fig. 2, illustrating one relative position of the clip and trim member during installation of the trim member.
Figure 5:
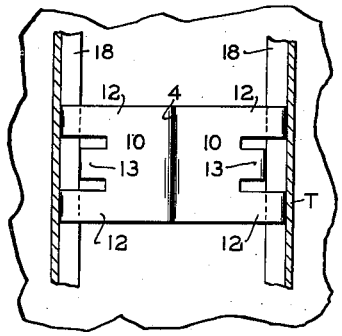
Fig. 5 is a longitudinal section taken along the line 5—5 in Fig. 3.

Referring to Figs. 1 to 5, inclusive, the preferred embodiment of the invention is shown in connection with a support S, to which is to be secured a bead trim T. The clip itself is formed of a single strip of spring metal bent intermediate its ends to form a nose 1 with legs 2 divergent upwardly therefrom part way of their length and having portions 3 convergent away from the nose 1 so as to normally abut each other, as indicated at 4, when the clip is installed in the support, or preparatory thereto, or both.

The nose 1 and legs 2, including portions 3, form collectively a shank portion, and the lower ends of the portions 3 provide sloping locking shoulders 5 which engage the under side of the support S adjacent an aperture 6 therein when the clip is installed in operating position. Forming a continuation of and extending from the leg portions 3 are head portions 10 which, if desired, may be somewhat wider than the leg portions 3 and which are receivable within the trim member T for securing it to the support S. The head portions 10 are curved upwardly and outwardly from the point of abutment 4 and thence downwardly and inwardly toward the plane of the support, as illustrated.

Each head portion 10 is notched to provide a plurality of independently flexible locking fingers 12, one of which, preferably the intermediate finger, is in the form of a land 13. The free ends of the fingers 12 curve gradually inwardly toward the legs, as indicated at 15. Each of the lands 13, however, beginning at its point of connection with the head portion is bent on a sharper curve than the fingers 12 so as to be spaced inwardly toward the leg portions 3 more closely than the fingers 12. The free ends of the lands 13 extend beyond the free ends of the fingers 12 in a direction toward the support so as to engage at their free ends the outer face of the support S and thus space the free ends of the fingers 12, which provide trim locking shoulders 15, accurately from the support.

The clip is installed in the aperture 6 of the support nose foremost, which act disposes the shoulders 5 at the inner face of the support and the free ends of the lands 13 against the outer face of the support. In this position the shoulders 15 of the fingers 12 are spaced a sufficient distance from the support to accommodate between themselves and the support the inturned flanges or margins, indicated at 18, of the bead trim T.

However, variations in the thickness of the stock from which the trim T is formed and also irregularities in the flanges 18 and burrs thereon, resulting from processes of manufacture, make it necessary to provide different clearances between the shoulders 15 and the support at different parts of the trim. In order to render the clip universal regardless of these irregularities, some of the shoulders 15 are spaced slightly different distances from the support than others. Preferably, diagonally opposite shoulders are spaced the same distance from the support, though different from the other diagonally opposite shoulders. Consequently, the inturned flanges of any trim member will be gripped by at least one finger 12 of each head portion, thus assuring that the trim is engaged at both sides of its slot. In addition, the lands 13 are preferably spaced apart laterally of the trim member a distance such that they snugly and somewhat resiliently engage between the adjacent edges of the inturned flanges 18 thereof and thus act as spacing abutments for positioning the trim member accurately laterally with respect to the clip and aperture.

Further adjustment for accommodating different thicknesses of bead trim or irregularities thereon is provided by the resiliency of the fingers 12. Obviously, the fingers 12 yield more readily than would the solid head portions and different portions thereof may yield independently of others. Consequently, irregularities in the trim alongside one portion of the heads may be gripped firmly with one of the fingers 12 without effecting the gripping action of other of the fingers with a relatively thinner portion of the trim.

Figure 6:
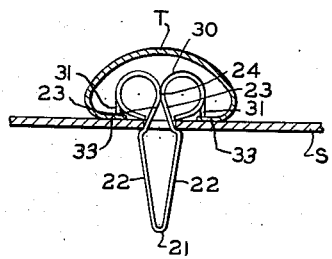
Fig. 6 is an end elevation of a modified form of the clip and the support and trim member connected thereby.
Figure 7:
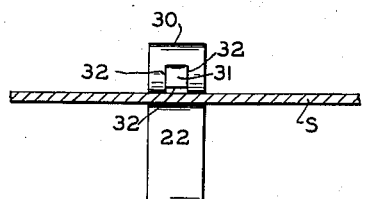
Fig. 7 is a side elevation of the clip and connected members illustrated in Fig. 6.

Referring next to Figs. 6 and 7, a clip having the advantages above described is illustrated. In this form of the clip, however, the free end portions of the fingers which curve gradually inwardly toward the legs of the clip, such as the portions heretofore indicated as 15, form the lands for engaging the support and one of the fingers which, in the form heretofore described, engage the support, engage the flanges of the trim member.

The clip illustrated in Figs. 6 and 7 comprises a nose portion 21 with leg portions 22 divergent therefrom part way of their length. The leg portions are then convergent part way of the remainder of their length, as indicated at 23, so as to normally abut each other as indicated at 24 when the clip is installed in the support or preparatory thereto or both. The nose portion 21, leg portions 22 and convergent portions 23 collectively provide a shank portion. Forming a continuation of and extending from the leg portions 23 are head portions 30 which are preferably somewhat wider than the leg portions and are receivable within the trim member T for securing to the support S.

The head portions 30 are curved upwardly and outwardly from the point of abutment 24 and thence downwardly and inwardly toward the plane of the support S. These head portions, at their lower margins, are arranged to engage the outer face of the support and provide lands, corresponding in function to the lands 13 heretofore described. Between its lateral limits each of the head portions 30 is provided with a tongue or finger portion 31 which is preferably formed by severing a portion of the metal of the head portion 30 along two sides and the lower end, as indicated at 32.

The finger portion 31 terminates short of the lower portions of the head portions 30 so that when the head portions 30 engage the outer surface of the support S, the lower ends of the fingers 31 are slightly spaced from the outer surface of the support in a direction away from the nose 21, this spacing being sufficient to accommodate the flanges 33 of the trim member T between the lower ends of the fingers 31 and the outer surface of the support. In this form of the structure land surfaces are provided at each side of the finger 31 so that locking of the clip during installation of the trim member thereonto is prevented.

It is apparent from the foregoing description that a simple and effective clip for the purposes recited is provided and that the clip may be installed in the support preparatory to the installation of the trim member thereon.

Having thus described my invention, I claim:

1. A spring clip device for securing a pair of apertured members in juxtaposition and comprising a single strip of spring metal having a snap fastening shank portion arranged for reception through an aperture in one of said members for snap fastening engagement therewith, and having portions thereon in the form of separate heads, each head comprising at least three independently flexible fingers arranged in a row and extending generally toward the shank portion, one finger being disposed between the other two fingers and arranged for engagement with one of said members, the other two fingers being arranged for engagement with the other one of said members.

2. A spring clip device for securing an element having an opening thereto to an apertured support, and comprising a single strip of spring metal having a snap fastening shank portion arranged for reception lengthwise of the shank portion through an aperture in the support for snap fastening engagement with the support, and having portions thereon in the form of separate heads, each head comprising at least three independently flexible fingers arranged in a row and extending generally toward the shank portion, one finger being disposed between the other two fingers and extending beyond the other fingers in a direction toward the shank portion and being in the form of a land arranged for engagement with the outer surface of the support for positioning the other two fingers with their free ends in spaced relation from the outer surface of the support when the device is installed in the support, and the said other two fingers being in the form of element locking shoulders adapted for engagement with the marginal surfaces of the element adjacent the opening for securing the element to the support when the lands are in engagement with the support and the said spring clip device is installed in the support.

3. A spring clip device for securing an element having an opening therein to an apertured support, and comprising a single strip of spring metal having a snap fastening shank portion arranged for reception lengthwise of the shank portion through an aperture in the support for snap fastening engagement with the support, and having portions thereon in the form of separate heads, each head comprising at least three independently flexible fingers arranged in a row and extending generally toward the shank portion, one finger being disposed between the other two fingers, said other two fingers extending beyond the said one finger in a direction toward the shank portion and being in the form of lands arranged for engagement with the outer surface of the support for positioning the said one finger with its free end in spaced relation from the outer surface of the support when the device is installed in the support, and the said one finger being in the form of an element locking shoulder adapted for engagement with the marginal surface of the element adjacent the opening for securing the element to the support when the land is in engagement with the support and the said spring clip device is installed in the support.

JOHN H. VAN UUM.